United States Patent [19]

Hatakeyama et al.

[11] Patent Number: 4,618,901
[45] Date of Patent: Oct. 21, 1986

[54] HIGH DENSITY MAGNETIC HEAD

[75] Inventors: Iwao Hatakeyama; Yasushi Maeda; Osamu Ishii; Shizuka Yoshii, all of Ibaraki, Japan

[73] Assignee: Nippon Telegraph & Telephone Public Corporation, Tokyo, Japan

[21] Appl. No.: 515,135

[22] Filed: Jul. 19, 1983

[30] Foreign Application Priority Data

Jul. 19, 1982 [JP] Japan ............................. 57-124317
May 20, 1983 [JP] Japan ............................. 58-87557

[51] Int. Cl.$^4$ ............................................. G11B 5/127
[52] U.S. Cl. ................................... 360/114; 360/110
[58] Field of Search ............... 360/114, 110; 369/13, 369/100, 110

[56] References Cited

U.S. PATENT DOCUMENTS

| | | | |
|---|---|---|---|
| 3,196,206 | 7/1965 | Griffiths | 360/114 |
| 3,475,738 | 10/1969 | Louis et al. | 360/114 |
| 3,592,964 | 7/1971 | Waring | 360/114 |
| 3,737,236 | 6/1973 | Borrelli | 356/369 |
| 4,101,947 | 7/1978 | Lambeth | 360/114 |

OTHER PUBLICATIONS

Morrison et al., "Readback Head for High-Density Recording", IBM Technical Disclosure Bulletin, vol. 9, No. 2, Jul. 1966, p. 124.
Albert et al., "Magneto-Optical Read-Out System", IBM Technical Disclosure Bulletin, vol. 14, No. 7, Dec. 1971, p. 2160.
O'Brien, "Magneto-Optic Conversion Device", IBM Technical Disclosure Bulletin, vol. 13, No. 8, Jan. 1971, p. 2276.

Primary Examiner—John H. Wolff
Assistant Examiner—Matthew J. Bussan
Attorney, Agent, or Firm—Armstrong, Nikaido, Marmelstein & Kubovcik

[57] ABSTRACT

A magnetic head for digital signal recording/reproducing (FIG. 11) having a C-ring shaped core (11.1) with a gap (G) for introducing leakage flux of a recording medium, a conductor (11.2, Y) for generating bias flux in hard magnetization axis of the core (11.1), apparatus (10.3, 11.3) for illuminating the core (11.1) with polarized optical beam, apparatus (11.4) for analyzing beam reflected by the core to convert polarization rotation to optical strength, and photo-detector (12.5) for providing electrical output signal relating to optical strength. The core is small enough to have a single magnetic domain, and is magnetized in the whole area because of the presence of the bias flux in spite of weak leakage signal flux, thus, the core has the capability to amplify signal flux, thus, the present head has high sensitivity and is capable of detecting flux in small area to be used for high density recording higher than 8000 bits/mm.

6 Claims, 26 Drawing Figures

HIGH DENSITY MAGNETIC HEAD

BACKGROUND OF THE INVENTION

The present invention relates to a magnetic head, in particular relates to such a magnetic head for recording and/or reproducing a magnetic signal on a magnetic medium with high recording density. The present invention relates in particular to a digital signal recording/reproducing system.

The high density magnetic recording technique has been considerably improved, with the recording density becoming ten times as large as that of ten years ago. For instance the recording density up to 8000 bits/mm has been reported in an experiment with a single pole head. However, that value (8000 bits/mm) is obtained merely in an experiment, and the practical value is less than 3000 bits/mm even when a single pole head for vertical recording is used.

Some of the important problems for achieving the high recording density are (1) to improve the remanent magnetization of a medium, (2) to keep the duration between a head and a medium small (less than 1 μm), and/or (3) to improve the sensitivity of a head.

Some of the prior magnetic heads are first described.

(1) A single pole head;

A single pole head as shown in FIG. 1 has the highest recording/reproducing density at present. In FIG. 1, the reference numeral 1.1 is a main magnetic pole, 1.2 is an auxiliary magnetic pole, 1.3 is a coil wound on the auxiliary magnetic pole 1.2, 1.4 is a recording medium which is made of for instance Co-Cr, 1.5 is a base support for supporting said medium 1.4, and 1.6 shows the width of said main magnetic pole 1.1.

In FIG. 1, the leakage flux generated by the recorded signal on the recording medium 1.4 magnetizes the end of the main pole 1.1, then, the leakage flux from the main pole 1.1 is detected by the coil 1.3 wound around the auxiliary magnetic pole 1.2. In this case, the main magnetic pole 1.1 must directly contact with the recording medium 1.4 since the leakage flux from the recorded signal is very weak, and the recording medium 1.4 and the base support 1.5 must be flexible and thin since the duration between the main pole 1.1 and the auxiliary pole 1.2 must be less than 50 or 60 microns for detecting the leakage flux from the small main pole 1.1 (the width 1.6 of which is usually the same as the bit size (0.2-5.0 microns)). Accordingly, a single pole head in FIG. 1 is used only for a floppy disc, but cannot be used for a hard disc which has high recording density since the thickness of a hard disc is larger than 1-2 mm, and a single pole head cannot be used for that thick recording disc.

(2) A magneto-resistance head (MR head);

An MR head is shown in FIG. 2, in which the reference numeral 2.1 is a magneto-resistance element made of for instance permalloy film with the thickness (t), the width (w) and the length (L), 2.2 is a conductor provided at both the ends of said element 2.1. The MR head operates on the principle that the resistance of the element 2.1 depends upon the magnetic flux provided by the recording medium 1.4.

In FIG. 2, when some predetermined current flows through element 2.1, the voltage across the element 2.1 changes according to the magnetic flux recorded on the medium 1.4, and said voltage is the output voltage of the head. The detailed analysis of an MR head is discussed in (IEEE, Trans. on Mag. Vol. MAG-7. No. 1 pp150-154, 1971, USA by R. P. Hunt in Ampex company), and according to that article, the output voltage V is proportional to $(1-e^{-kw})/kw$, where $k=2\pi/\lambda$, and $\lambda$ is the recording wavelength which is twice as long as the recording bit length. According to said equation, when the wavelength is small, the width (w) must be small in order to obtain the enough output voltage. For instance when $=0.2$ micron, the width (w) must be less than 1.0 micron, which is unpractical for manufacturing process. The loss increase with the width (w) in an MR head comes from the open magnetic loop of a magnetic circuit.

FIG. 3 shows the improvement of an MR head, and the head of FIG. 3 has the closed magnetic circuit (article MR 82-24 in the Japanese Institute of Electronics and Communication, magnetic recording study group). In FIG. 3, the reference numeral 3.1 is a return path of flux and is made of ferrite, and 3.2 is non-magnetic portion, 2.1 and 2.2 show the same members as those of FIG. 2. The flux signal applied to the end of the MR element 2.1 returns to the recording medium through the return path 3.1. Thus, the reproduction of the signal with the width of 0.13 micron is possible by using the MR element with the width 20 microns on the condition that the relative output level is −45 dB. When the relative output level is −6 dB, said signal width must be 1.27 micron. Further, said output level is obtained on the condition that the medium contacts directly with the head. If the head aparts from the medium by the length L', the output level decreases by $e^{-kL'}$. For instance, when the bit period is 0.1 micron and the length between the head and the medium is 0.1 micron, the output level decreases to 0.04, which cannot be reproduced even if that improved MR head in FIG. 3 is used.

Concerning the decrease of the output level by the gap between the head and the medium, the vertical flux component Hy by the vertically recorded signal as shown in FIG. 4 is shown by the following equation.

$$Hy = 2\pi M_r e^{-(\pi/d)y} (Oe) \tag{1}$$

where $M_r$ is the remanent magnetization on the medium, d is the bit width, and the thickness loss by the thickness of the medium is neglected on the assumption that the thickness (t) of the medium is considerably larger than the bit width (d). The relations of the equation (1) is shown in the curves of FIG. 5, where $M_r = 1000$ emu/cc.

(3) Optical magnetic reproduction;

FIG. 6 shows the prior optical magnetic reproduction head, in which the reference numeral 6.1 is an optical source by a semiconductor laser, 6.2 is a polarizer, 6.3 is a beam splitter, 6.4 is an analyzer, 6.5 is an optical detector by a photo-diode, and 6.6 is magnetization. The optical beam generated by the optical source 6.1 is converted to a linear polarization by the polarizer 6.2, and the converted linear polarization is applied to the recording medium 1.4. The numeral 1.5 is a base support. The input beam is reflected by the medium, and the polarization direction of the reflected beam rotates on the principle of the magneto-optical effect according to the magnetization on the medium. The reflected beam is applied to the detector 6.5 through the optical analyzer 6.4 (which has the same structure as the polarizer). The strength of the optical beam at the output of the analyzer 6.4 depends upon the direction of the magnetization on the medium, therefore, the output voltage of the optical detector 6.5 depends upon the magnetization on the medium. In an optical magnetic head, the resolving power of the recorded bits is restricted by the diffraction limit. When a semiconductor laser with the wavelength 0.8 micron is used, the diffraction limit of that laser beam is about 0.4 micron. A laser source with the shorter wavelength would be requested for improving the resolving power, however, 0.8 micron wavelength is the limit at present, and no improvement of the recording density is expected so long as the present laser is used.

(4) A copy type optical head (Magnetic recording study group report MR 79-11, Japanese Institute of Electronics and Communications);

FIG. 7 shows a prior copy type optical head, in which 7.1 is a soft magnetic film made of for instance garnet or permalloy, 7.2 is magnetic flux in said soft magnetic film 7.1, 7.3 is leakage flux from the recording medium 1.4, and other numerals show the same memebers as those of the previous figures. In FIG. 7, the soft magnetic film is magnetized by the leakage flux 7.3 from the recording medium 1.4, thus, a magnetic copy of the recording medium is obtained in the soft magnetic film 7.1. The magnetic flux in the film 7.1 is optically read out on the same principle as that of FIG. 6. Although the head of FIG. 7 has the advantage that the medium noise is reduced since recording medium is not directly illuminated, that copy type head of FIG. 7 has still the restriction that the resolving power of the recorded bits depends upon the diffraction limit of the optical beam. Accordingly, the minimum size of the reproducable bit is about 0.5 micron with the use of such a head.

FIG. 8 is a prior modification of a copy type optical head, and the configuration of FIG. 8 is shown in the Japanese patent publication 33781/81, in which 8.1 is a reflection mirror, 8.2 is an optical beam, and other members in FIG. 8 are the same as those of the same numeral members in the previous figures. The feature of the structure of FIG. 8 is that the soft magnetic film 7.1 contacts with the medium 1.4 with some angle P, thus, the reproduction of the shorter wavelength signal is improved. However, as mentioned in accordance with FIG. 5, the magnetic flux at the top of the head is very small when some duration between the head and the recording medium is provided. Further, the optical head has the disadvantage in general that only 1/100 of saturated level of the magnetic change can be used because of the shot-noise of the detector, and thus, the sensitivity of an optical head is small. Further, since the structure of FIG. 8 has no idea to illuminate the area closer than several microns to the end of the soft magnetic film 7.1, the reproduction of a small bit less than 1 micron is impossible.

Another modification of a copy type optical head which is shown in U.S. Pat. No. 3,737,236 is shown in FIG. 9, in which 9.1 is an optical fiber, 9.2 is a core of that optical fiber, and other numerals are the same as those of the same numerals in the previous figures. The soft magnetic film 7.1 in FIG. 9 is positioned at the top of the optical fiber 9.1. Since the diameter of the core 9.2 is less than 50-60 microns, the optical beam can be concentrated on a small area of the soft magnetic film 7.1, and thus, the problem in FIG. 8 is solved by the structure of FIG. 9. However, the head of FIG. 9 has still the disadvantage that no idea is presented for the detection of a signal when leakage flux is weak due to the small recording bit. Further, no idea is presented for compensating the change of the polarization direction in an optical fiber in spite of the fact that an optical head reproduces a signal through the change of the polarization direction of an optical beam.

By the way, the technique for applying bias flux in the magnetization hard axis for improving the sensitivity of the flux detection has been known in "Determination of Low-Intensity Magnetic Fields by Means of Ferromagnetic Film" by F. G. West et al in J. Appl. Phys. 34, pp1163, 1963, and/or "Vapor-Deposited Thin Film Recording Heads" IEEE Trans. on Mag. vol. MAG-7, pp675, 1971. In those prior arts, bias flux is applied in the magnetization hard axis direction, and the flux in a core is detected by a winding wound around the core. Due the presence of the winding, the size of the core must be larger than 500 microns (each side). Therefore, the flux to be detected must be uniform among the wide area which is equal to or larger than the size of the core. Further, due to the large size of the core, a plurality of magnetic domains exist in the core, and the magnetic flux in each domains might be random. Of course, the random flux in each domain decreases the sensitivity of the detection of the flux.

Accordingly, the above two prior arts are impossible to apply for the detector of the magnetic flux which is weak and exists in very narrow limited area, although the sensitivity for detection flux which is uniform in a large area is somewhat improved.

Therefore, the above two prior arts are not suitable for a magnetic head for high recording density in which magnetic flux of each magnetic cell to be detected is limited to a very small area.

As described above in detail, a prior magnetic head has the disadvantage that a small bit (less than 1 micron) can not be reproduced, and therefore, is not capable of reproducing high recording density signal.

Therefore, an improved magnetic head for the use of higher recording density has been desired.

SUMMARY OF THE INVENTION

It is an object, therefore, of the present invention to overcome the disadvantages and limitations of a prior magnetic head by providing a new and improved magnetic head.

It is also an object of the present invention to provide an improved head which can record and reproduce magnetic signal with high recording density and high sensitivity.

The above and other objects are attained by a magnetic head comprising (a) a thin substantially C-ring shaped magnetic core with a gap G which accepts leakage flux from a recording medium, (b) detection means for detecting magnetic status in said core to provide electrical output signal, (c) said core being small enough to have a single magnetic domain and having an easy magnetization axis perpendicular to the longitudinal direction of said gap G, and (d) said detection means being an optical detection means.

Preferably, bias flux is introduced in the hard magnetization axis of the core. The bias flux is synchronized with the signal to be reproduced, or the frequency of the bias flux is higher than that of the reproduced signal.

The use of a C-ring shaped magnetic core is one of the features of the invention. Secondly, the small size of the core which has only a single magnetic domain is another feature of the present invention. The small size of the core is advantageous for high recording density. Further, the optical reading of the flux in the core is another feature of the present invention. It should be noted that the flux in a core has been conventionally detected by a coil wound around the core. However, due to a small size of the present core, it is almost impossible to wind a coil which can provide sufficient output voltage around the core. The optical reading of the flux is the solution for that problem.

Further, bias flux in the hard magnetization axis direction provides substantially the amplification of the flux in the core. Therefore, the present head can reproduce very weak flux, thus, is suitable to reproduce high density recording signal.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
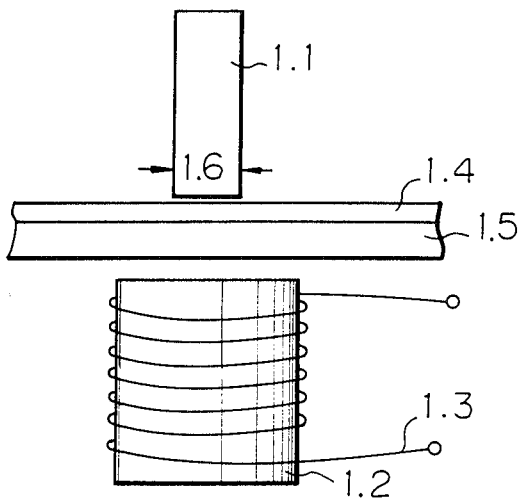
FIG. 1 is a prior vertical recording head.
Figure 2:
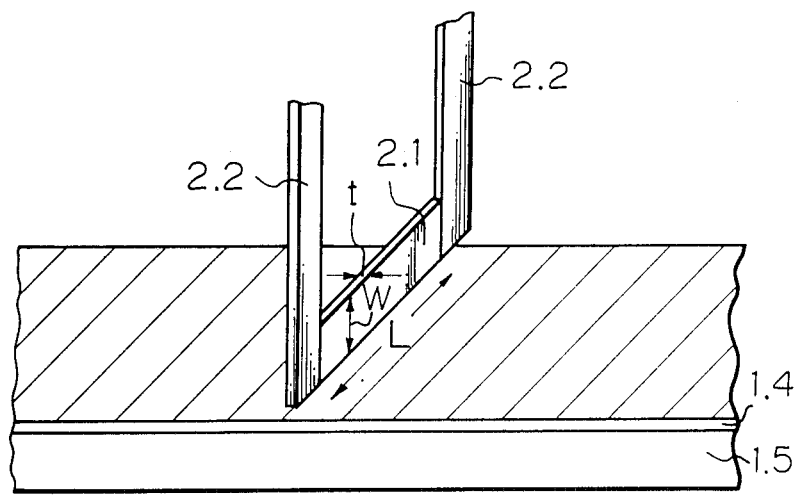
FIG. 2 is a prior magneto-resistance head.
Figure 3:
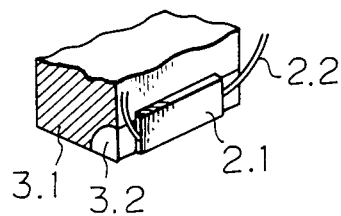
FIG. 3 is a modification of a prior magneto-resistance head.
Figure 4:
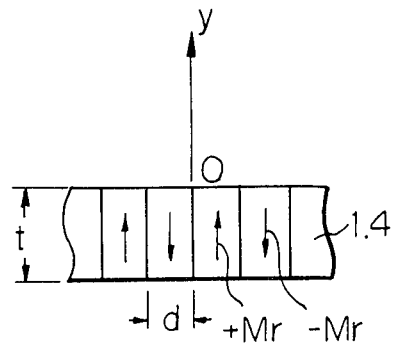
FIG. 4 is an explanatory drawing for calculation of flux on a vertical recording medium.
Figure 6:
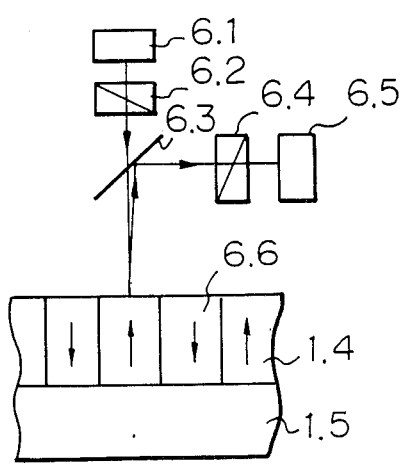
FIG. 6 is a prior optical-magnetic reproduction head.
Figure 7:
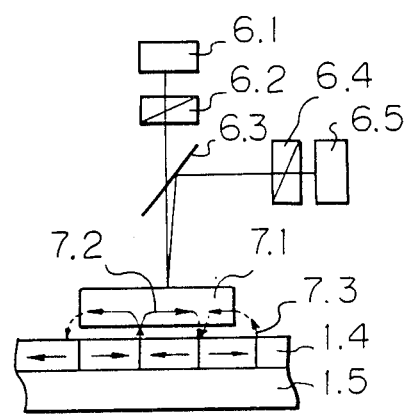
FIG. 7 is a prior copy type optical magnetic head.
Figure 5:
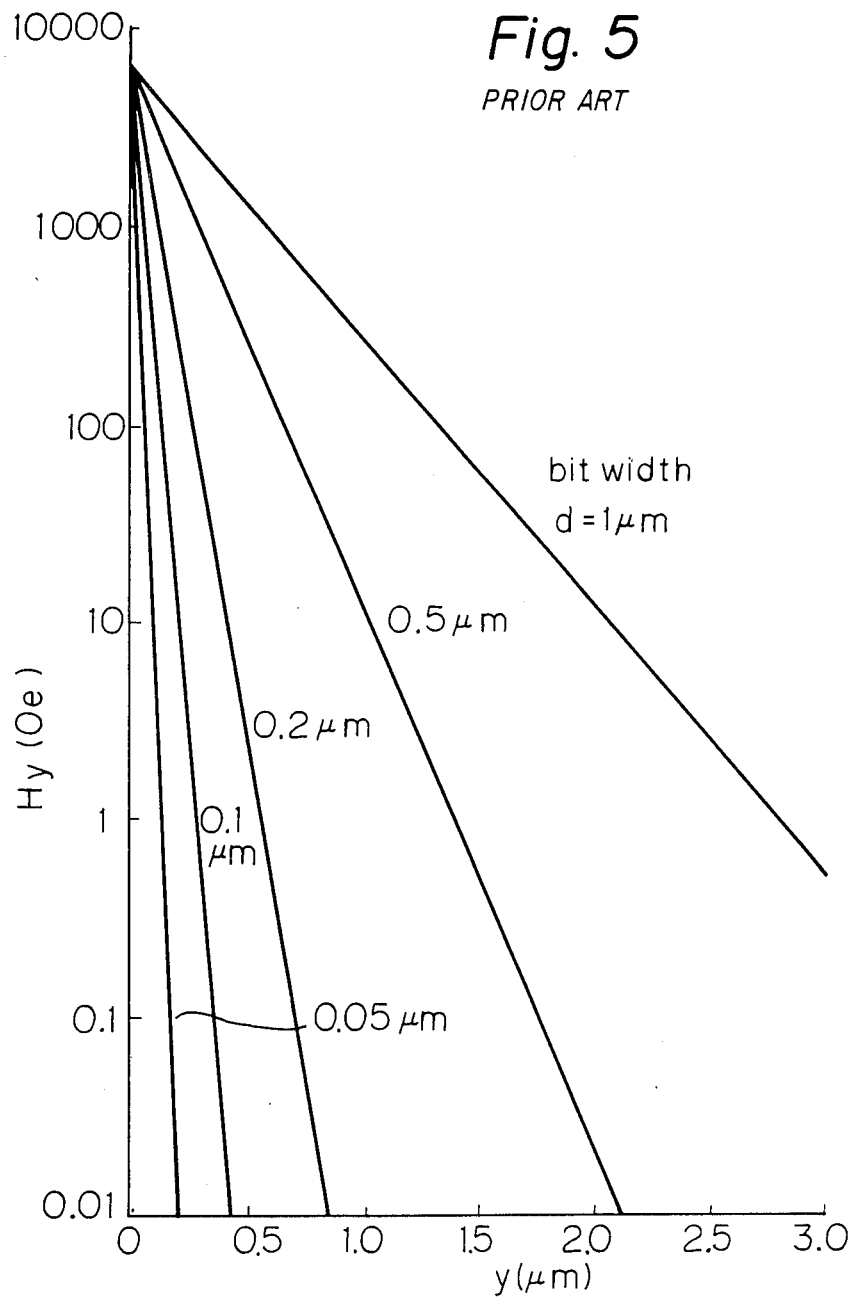
FIG. 5 shows curves of the flux Hy in the vertical direction for each length between a head and a recording medium, calculated by the model of FIG. 4.
Figure 8:
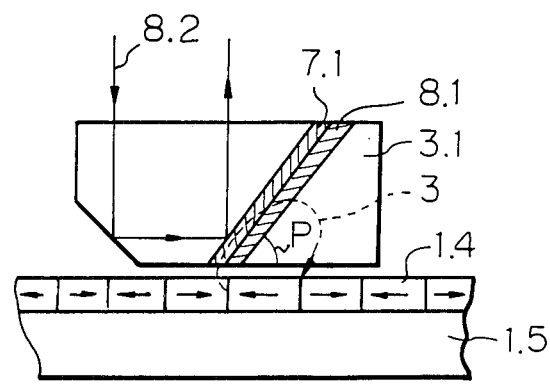
FIG. 8 is a modification of a copy type optical head.
Figure 9:
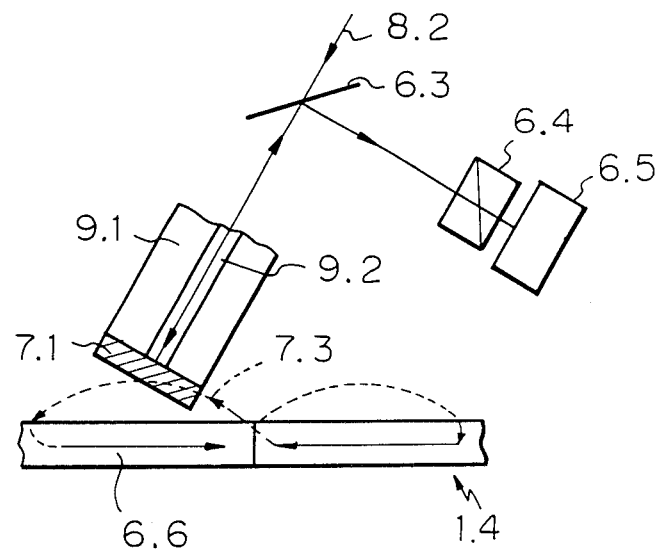
FIG. 9 is another modification of a copy type optical head.
Figure 10A:
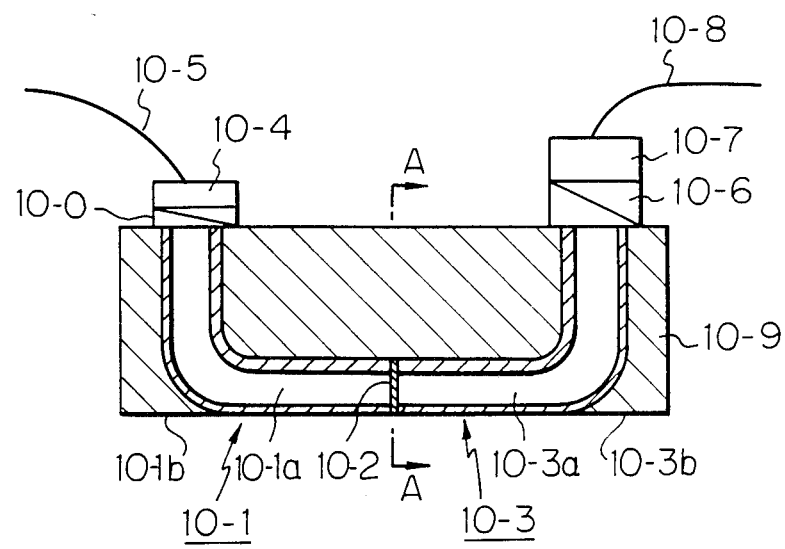
FIGS. 10A through 10C show structure of the present magnetic head.
Figure 10B:
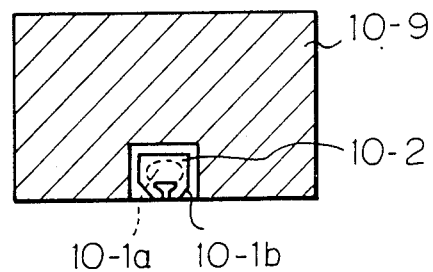
Figure 10C:
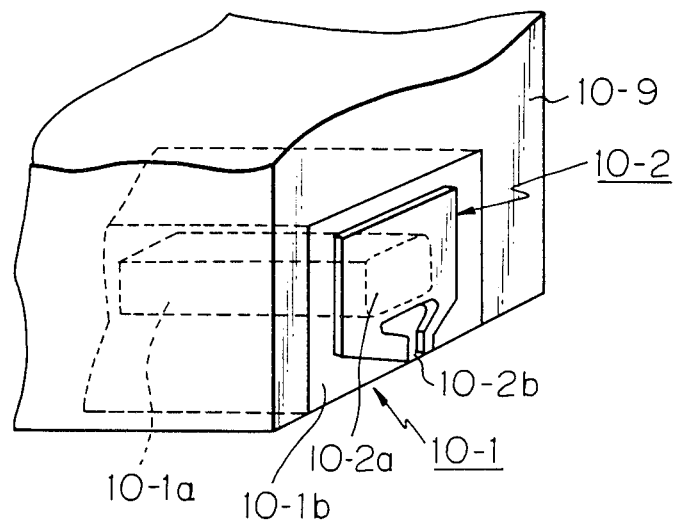

FIGS. 10A through 10C show the first embodiment of the present magnetic head, in which FIG. 10A is the cross sectional view of the present magnetic head, FIG. 10B is the cross section at the line A—A of FIG. 10A, and FIG. 10C is the fragmentary perspective view of the head of FIG. 10A.

In those figures, the reference numeral 10-1 is a polarization maintaining single mode waveguide, and comprises a core portion 10-1a and a clad portion 10-1b. Numeral 10-2 is a magnetic thin film made of soft magnetic material provided on the cross section plane of said waveguide 10-1, and said film 10-2 is substantially in C-ring shaped as shown in FIGS. 10B and 10C. The numeral 10-3 is another polarization maintaining single mode optical waveguide having the core portion 10-3a and the clad portion 10-3b. The numeral 10-4 is an optical source which provides an optical beam which had single polarization, 10-5 is a lead wire for supplying power to said optical power source 10-4, 10-0 and 10-6, are a polarizer and an analyzer, respectively 10-7 is a photodetector for converting optical energy to electrical energy, 10-8 is a lead wire for providing an output singnal of the detector 10-7, and 10-9 is a substrate for supporting the above members.

It is supposed that the external size of the magnetic film 10-2 is a little larger than the cross section of the core portion 10-2a as shown in FIG. 10C, and said magnetic film 10-2 terminates the core portion 10-2a completely. The magnetic film 10-2 has a gap 10-2b (see FIG. 10C) which contacts with the clad portion 10-1b of the waveguide 10-1.

It should be noted that the size of the magnetic film 10-2 is as small as the cross section of a single mode optical waveguide, and preferably, that size of the magnetic film is as small as the size to have a single magnetic domain in the film. In order to have a single magnetic domain, the length or sizes of the film must be shorter than 10 microns.

In operation, the gap 10-2b is positioned closely to the recording medium which runs relative to the head, and takes the leakage flux from the magnetic medium. On the other hand, the polarized beam from the optical source 10-4 illuminates the film 10-2 through the waveguide 10-1. The polarization plane of the beam rotates when the beam passed through the magnetic film 10-2 by the Faraday effect. The polarized output beam of the film 10-2 is applied to the analyzer 10-6 through the optical waveguide 10-3. Thus, the intensity of the output beam of the analyzer 10-6 depends upon the rotation of the polarization plane which reflects the leakage flux. The photo-detector 10-7 then provides the electrical signal depending upon the intensity of the output beam of the analyzer 10-6. It should be appreciated that the waveguides 10-1 and 10-3 are a polarization maintaining optical waveguide and therefore the polarization plane of the beam is not disturbed during the transmission in those waveguides. The polarization maintaining optical waveguide is obtained for instance by an optical guide whose core portion is in ellipse shape, or an optical guide in which refractive index in a longer axis direction of the core portion is different from that in a shorter axis direction.

It is preferable that the waveguides 10-1 and 10-3 are a single mode waveguide which transmits only a single mode so that no undesired mode which makes noise is induced in those waveguides. The condition of a single mode waveguide is that the normalized frequency v is less than 2.4, where the normalized frequency v is shown in the equation below.

$$v = \frac{2\pi n a \sqrt{2\Delta}}{\lambda}$$

where (a) is the radius of the waveguides 10-1 and 10-3, ($\lambda$) is the wavelength of the optical beam, ($\Delta$) is the refractive index difference between the core and the clad, and (n) is the refractive index of the core. In order to satisfy the single mode condition (v is less than 2.4), it is preferable that $(\lambda)=0.6-1.2$ micron, $(\Delta)=0.5\%$, and the diameter of the core $(2a)$ is $3.1 \sim 6.3$ micron.

Figures 10D, 10E:
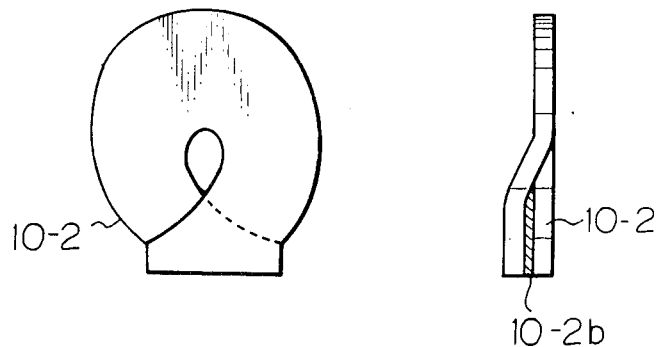
FIGS. 10D and 10E show modification of the magnetic head in FIGS. 10A through 10C.

FIGS. 10D and 10E show the preferable structure of the magnetic film 10-2, in which a very thin gap 10-2b is produced easily. In those figures, the film 10-2 is in the shape of a one-turn coil, and a thin $SiO_2$ film is sandwiched between the laminated portion of the one-turn coil. Of course, that thin film of $SiO_2$ operates as a gap. With the above structure, the thin gap narrower than 0.1 micron may be obtained without distorting the magnetic film itself.

Figure 11:
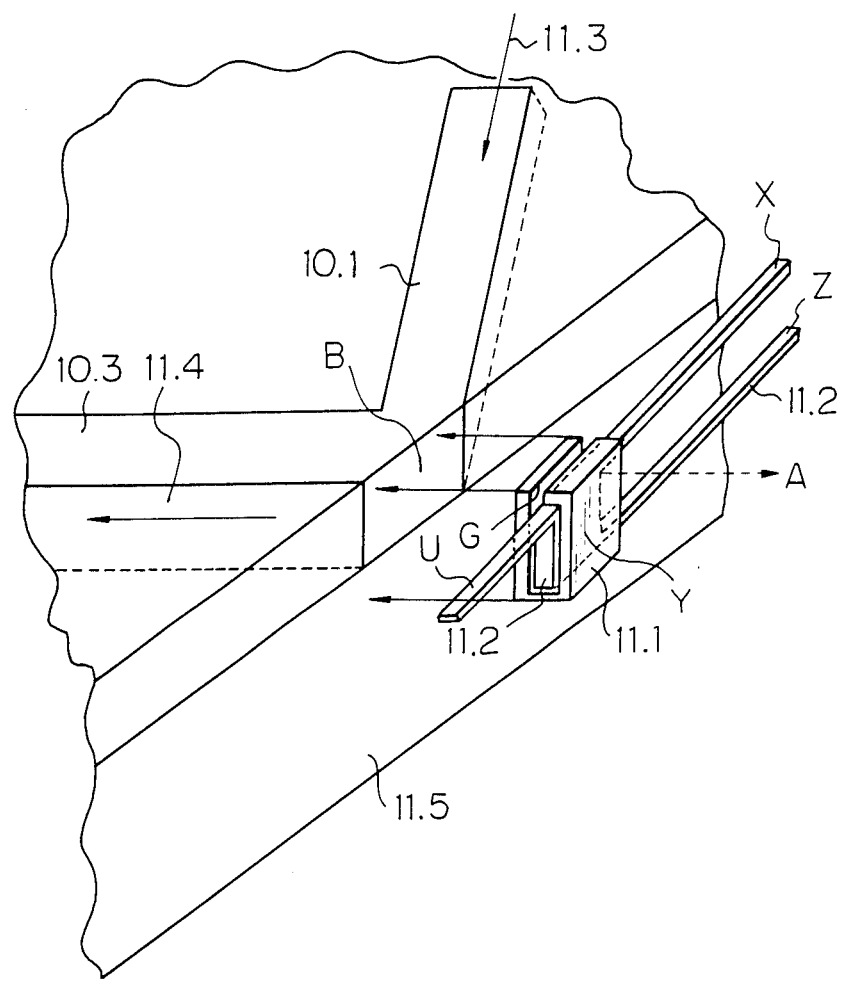
FIG. 11 shows the perspective view of another embodiment of the magnetic head according to the present invention.

FIG. 11 shows another embodiment of the magnetic head according to the present invention, and has the feature that the sensitivity of the head is considerably improved by applying the magnetic bias flux in the core. In FIG. 11, the reference numeral 11.1 is C-ring shaped core with a gap G, and said core 11.1 is made of soft ferro-magnetic material. The numeral 11.2 is a conductor for inducing magnetic flux in the core 11.1, and said conductor 11.2 has the arms X, Y, Z and U. The numeral 11.3 is an input optical beam which illuminates a wall of the core 11.1, 11.4 is a reflected beam by said wall, and 11.5 is a substrate for supporting the above members. It is supposed that the optical beams 11.3 and 11.4 are guided by a single mode optical guide 10.1 which maintains the polarization direction of the beam. The core 11.1 is positioned so that one of the walls of the same contacts with the bended portion B of the guide 10.1. It is supposed that a magnetic medium (not shown) like a magnetic tape, or a magnetic disc runs relative to the head in the direction A which is perpendicular to the longitudinal direction of the gap G. Of course, said magnetic medium contacts with or positions very close to the gap G.

Figure 12:
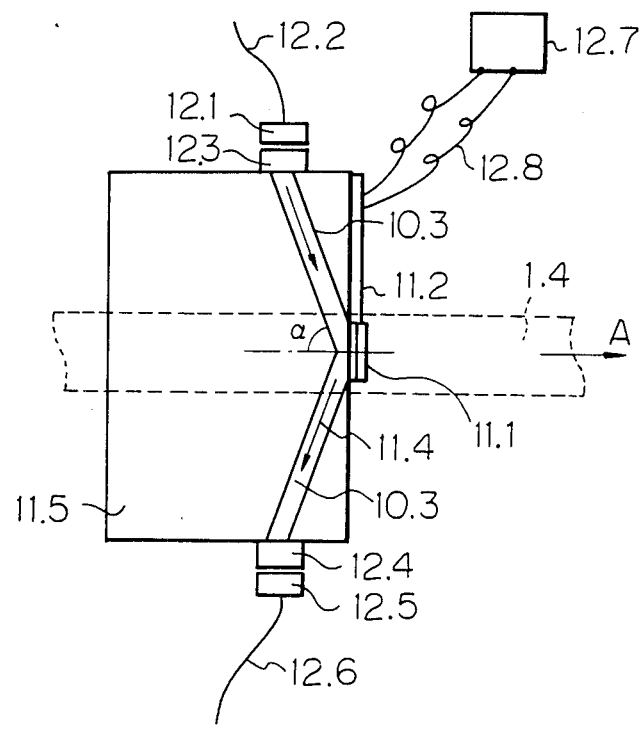
FIG. 12 shows the whole view of the magnetic head in FIG. 11.

FIG. 12 shows the whole structure of the head system including the magnetic head of FIG. 11. In FIG. 12, the reference numeral 12.1 is an optical source which is implemented by a semiconductor laser, 12.2 is a lead wire for supplying power to said semiconductor laser, 12.3 is a polarizer, 12.4 is a polarization analyzer, 12.5 is a photo-detector implemented by a photo-diode for converting optical energy to electrical signal, 12.6 is an output lead wire, 12.7 is a power source for providing bias current, and 12.8 is a lead wire for supplying bias current to the conductor 11.2. The recording medium 1.4 runs in the direction A which is perpendicular to the longitudinal direction of the gap G of the head. It is supposed that the size of the core 11.1 is small enough to provide a single magnetic domain, and the length of each side of the core is preferably less than 10 microns. The core 11.1 is made of soft ferro-magnetic material like permalloy, cobalt-zirconium alloy, or sendust alloy.

In operation, the leakage flux of the recorded signal on the recording medium 1.4 magnetizes the core 11.1. On the other hand, an optical beam generated by the optical source 12.1 is converted to a linear polarization beam by the polarizer 12.3, and the output beam of the polarizer illuminates the wall of the head core 11.1 through the optical guide 10.3. The incident angle ($\alpha$) of the beam is preferably 60°–70°. It should be appreciated that the polarization direction of the reflected beam 11.4 which is reflected by the head core 11.1 rotates according to the magneto-optical effect (Kerr effect) depending upon the magnetization direction in the core 11.1. That is to say, the polarization direction of the reflected beam 11.4 has the information relating the direction of the magnetic flux in the recording medium. The reflected beam 11.4 is analyzed by the polarization analyzer 12.4 which provides the output beam the strength of which depends upon the polarization direction of the input beam. The output of the analyzer 12.4 is applied to the photo-detector 12.5 which provides the electrical signal depending upon the strength of the input optical beam, and said electrical signal is obtained by the lead wire 12.6.

The important feature of the embodiment of FIGS. 11 and 12 is the improved sensitivity due to the application of a bias flux by the conductor 11.2. Thus, the head of the present embodiment can reproduce weak magnetic flux, and provides high density magnetic recording. The operation of the bias flux is described in detail in accordance with FIGS. 13 and 14, and FIG. 21.

Figure 13:
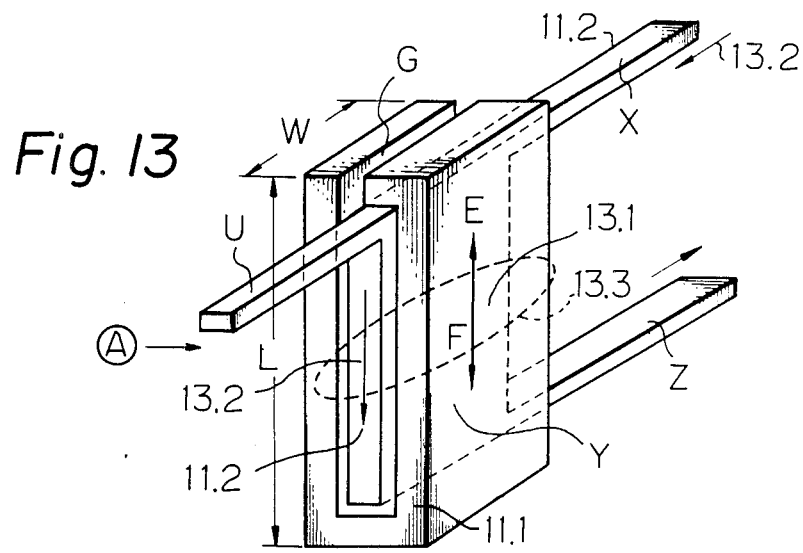
FIG. 13 is the perspective view for the explanation of the operation of the magnetic head in FIG. 11.
Figure 14:
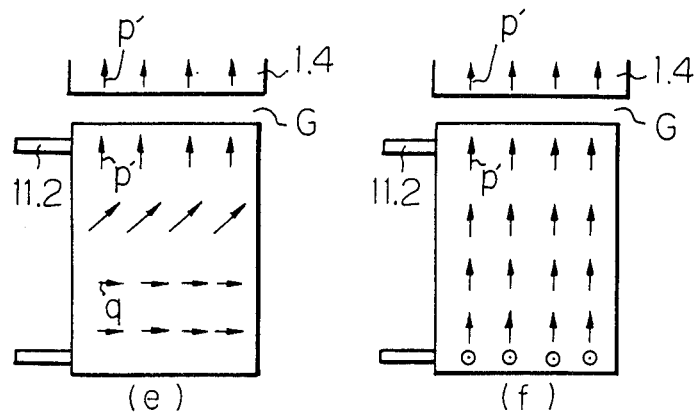

FIG. 13 is the perspective view of the head of FIG. 11, and the numeral 13.1 (symbol E) shows the magnetization easy axis of the core 11.1, 13.2 is the bias current, 13.3 (symbol F) is the bias flux generated in the core 11.1 by said bias current 13.2, and the symbol G is the gap of the core 11.1. The bias current is flowed in the conductor 11.2 through the arms X, Y and Z. When the current flows in the arm Y, said current generates the corresponding magnetic flux around the loop F which is in the direction of the magnetization hard axis. As apparent in FIG. 13, the magnetization easy axis 13.1 is perpendicular to the longitudinal direction of the gap G.

The magnetization easy axis is produced in the core by the heat process of the core which is positioned in the magnetic field the direction of which coincides with the desired magnetization easy axis, or by designing the length L in the magnetization easy axis longer than the width W. It is supposed that the whole core 11.1 has a single magnetic domain, which is implemented by providing the small size of the core (preferably both the lengths L and W are less than 10 microns), and by closing a pair of confronting walls of the core so that those walls couple with one another magneto-statically. The conductor 11.2 which is made of copper, aluminium or beryllium-copper with the arms X, Y, Z and U is positioned in the core 11.1 so that the arm Y is sandwiched between the confronting walls of the core. Although the conductor 11.2 does not need to be insulated from the core 11.1, some amorphous film like $S_iO$, $S_iO_2$ or $S_iN$ inserted between the arm Y of the conductor 11.2 and the walls of the core 11.1 improves the soft magnetization characteristics of the core 11.1 itself. It should be appreciated that the current in the arm Y of the conductor 11.2 generates magnetic flux in the magnetization hard axis which is perpendicular to the magnetization easy axis E.

Figure 21:
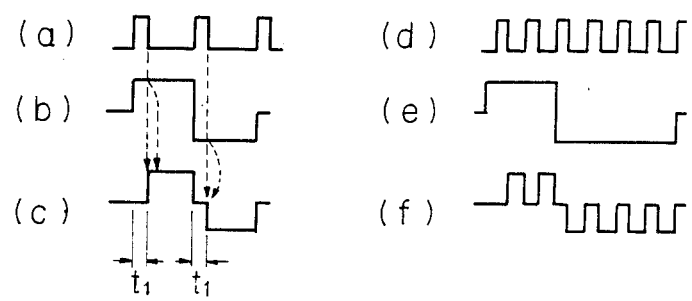
FIG. 21 shows operational time sequence of the magnetic head according to the present invention.
Figure 14:
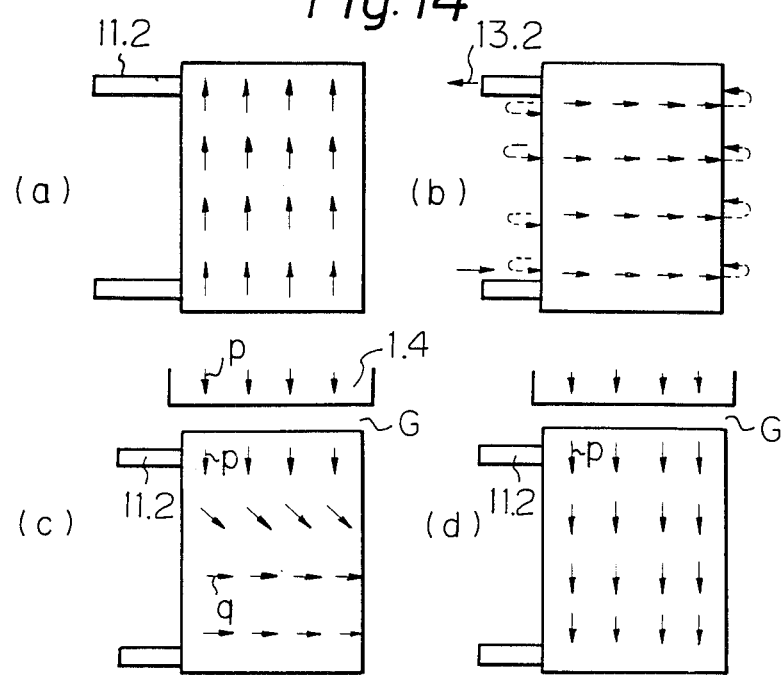
FIGS. 14(a) through (f) is explanatory drawing for the operation of the magnetic head in FIG. 11.

Now, the amplification effect by the bias flux is described in accordance with FIG. 14 and FIG. 21. FIG. 14 shows the magnetic flux in the wall of the core 11.1 with the view of the direction A of FIG. 13.

FIG. 14(a) shows the flux when no reproduction signal nor bias flux is provided to the core 11.1, and in this case all the flux is in the direction of the magnetization easy axis. FIG. 14(a) shows that the flux is in the upward direction in the drawing, and of course that direction may be downward.

When the bias flux larger than the anisotropy field of the core in the direction of the magnetization hard axis is applied to the core, the flux in the core is directed to the magnetization hard axis direction as shown in FIG. 14(b). In this case it should be appreciated that the flux at the end of the core is not disturbed since the reaction flux at the end of the core is small due to the magnetic coupling of a pair of closely confronting walls of the core and the opposite direction of the flux in the confronting walls.

Next, when the recording medium 1.4 comes close to the gap G and provides the flux in the direction p as shown in FIG. 14(c), the flux in only the small portion close to the gap G is directed in the direction p which is the same as the direction of the flux in the recording medium, but the flux at the major portion of the wall is still in the magnetization hard axis direction (q) as shown in FIG. 14(c). The flux might be slanted at the border.

Next, when the bias is switched OFF, all the flux in the wall is directed in the magnetization easy axis direction with a coherent rotation, and the direction is defined by the seed flux (p) close to the gap G. Thus, the flux in the whole wall of the core is directed in the direction (p) which is the same direction as that of the recorded flux as shown in FIG. 14(d). Accordingly, it should be appreciated that the flux in the wall coincides completely in the whole area of the wall because of the magnetization coherent rotation from the magnetization hard axis to the magnetization easy axis in the single magnetic domain. The flux pattern of FIG. 14(d) is read out optically by illuminating the wall with the laser beam and by detecting the polarization rotation of the reflection beam.

When the flux is in the upward direction p' as shown in FIG. 14(e), the resultant flux is in the same direction p' as shown in FIG. 14(f).

It should be noted from the above explanation that the switching energy for magnetizing the core 11.1 itself is supplied by the bias flux which may be strong enough, and the signal recorded on the medium merely triggers the direction of the flux in the core. Therefore, the very weak signal can magnetize the whole core completely, and the sensitivity of the core is considerably improved.

FIG. 21 shows the time sequence of the operation of the present head, in which the curves (a), (b) and (c) show the case that the bias flux is synchronized with the recording signal and has the same frequency as that of the recorded signal. The curves (d), (e) and (f) show the case that the bias flux has the higher frequency than that of the recorded signal. The curves (a) and (d) show the bias flux, the curves (b) and (e) show the recorded signal, and the curves (c) and (f) show the reproduced signal. In the curves (a) through (c), during the time ($t_1$) when bias flux exists, no reproducing signal appears, but just after the bias flux disappears, the reproducing signal with the same polarity as that of the recorded signal is obtained as shown in FIGS. 21(c) and 21(f).

The level of the seed flux for coinciding the flux on the whole core wall is now analyzed. The seed flux cannot be zero because of the distribution of the magnetic anisotropy in the core. The critical flux Hs for switching the whole flux in the direction of the signal flux is obtained by the following equations.

$$(h_x)^{\frac{2}{3}} + (h_y)^{\frac{2}{3}} = 1 \quad (2)$$
$$h_y = (\cot \theta) h_x \quad (3)$$

The equation (2) is the well known asteroid curve, $\theta$ is the average value of the anisotropy dispersion angle, $h_x$ and $h_y$ are flux in the magnetization easy axis direction and in the magnetization hard axis direction, respectively, normalized by the anisotropy field $H_k$. When the core is magnetically saturated in the magnetization hard axis direction, the critical flux $H_s$ for switching the flux direction in the magnetization easy axis direction is the twice of the horizontal coordinate $h_x$ of the cross point of the above two equations (2) and (3). And the critical seed flux $H_s$ is given by the equation (4) which is obtained through the solution of the equations (2) and (3).

$$H_s = 2H_k \left( \frac{1}{1 + (\cot \theta)^{\frac{2}{3}}} \right)^{3/2} \quad (4)$$

When the dispersion angle $\theta = 0.1°$, and the anisotropic field $H_k = 1$ Oe, the critical seed flux $H_s$ is calculated from the above equation (4) and the result is $H_s = 0.004$ Oe. Further, the depth of the magnetization in the core in the above condition is calculated by the equation (1) at the case of the 0.1 μm bit-width, and the result is 0.45 micron. It should be noted that the magnetization in the area of only 0.45 micron is expanded by the bias flux to the whole wall (10 microns) as described above.

Figure 15:
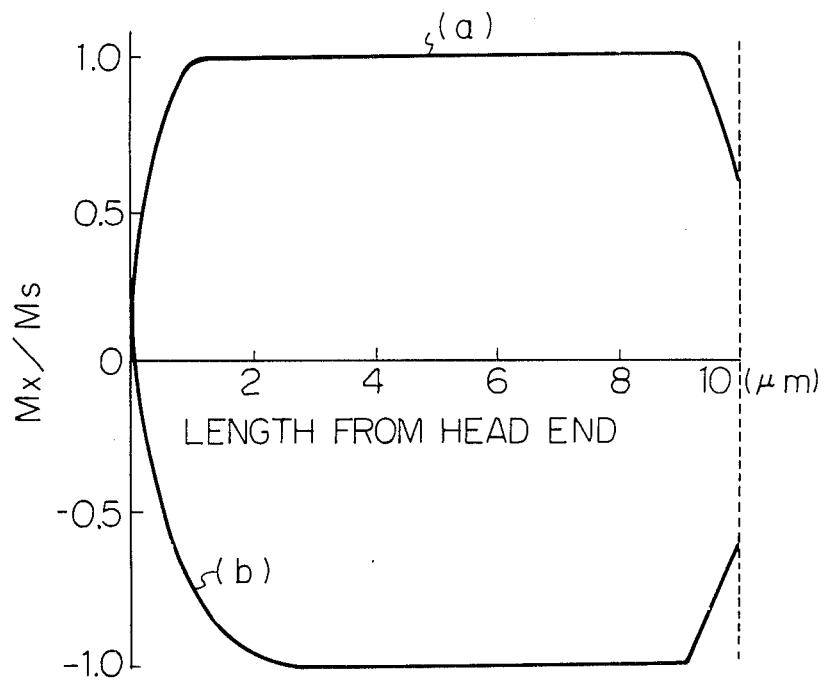
FIG. 15 shows experimental curves showing the magnetic distribution on the head.

According to our experiment, the seed flux only in the portion of 0.2–0.3 micron from the end of the core transfers up to the inner portion of 10 microns from the head end. FIG. 15 shows the curves of the experimental result, in which the core 11.1 is made of permalloy film with the size W=5 microns, L=10 microns, the thickness of the core wall is 0.1 micron, the duration between two walls is 1 micron, and the conductor 11.2 is made of aluminium, the substrate 11.5 is made of glass, the recording medium is Co-Cr magnetized in the vertical direction (direction perpendicular to the thickness of the recording film), and the diameter of the laser beam for reading out the magnetic status is 0.5 micron. The core is in an initial condition saturated in the negative direction, and after the Co-Cr recording media magnetized positive direction is contacted on the core gap, the magnetic flux (Mx) in the core is measured. The curve (a) in FIG. 15 shows the magnetic flux in the core where the horizontal axis shows the length from the head end (gap), and the bias flux is 10 Oe. It should be noted in the curve (a) that the flux in almost all area of the core is saturated to the positive direction ($M_x$), although end portion of the core is not saturated because of the demagnetization effect. On the other hand, the curve (b) of FIG. 15 shows the magnetic flux when no bias flux is applied, and it should be noted that only the small portion close to the head end is magnetized positive direction, but the core is as a whole still magnetized negative direction. It should be appreciated in FIG. 15 that the bias flux is effective to uniform the flux on the whole core by the seed flux, and the sensitivity of the head is then improved.

Next, another experimental result is described. The optical guide is produced on a quartz substrate by doping Ge in the $SiO_2$ film by 6 microns. The defractive index difference between the core of the optical guide and the quartz substrate is 0.23%. The pattern made of Ti of the optical guide is put on said film, then, the sputter process is performed in the gaseous atmosphere of $C_2F_6 + C_2H_4$ to remove the substrate except the patterned portion. Then, the Ti pattern (mask) is removed to provide an optical guide, and then, the whole surface is coated with $SiO_2$ film for the protection purpose. The bend portion of the optical guide is then polished, and a head core is produced on the polished portion of the optical guide through a thin film technique (RF sputtering and ion-beam sputtering), electronic beam exposure, and sputter etching. The anisotropic field $H_k$ of the core thus produced is 6 Oe. The dimension of the core is the same as the previous experiment described in FIG. 15. The optical source is AlGaAs laser diode which provides 0.78 micron wavelength beam, the polarizer and the analyzer are a Glanthomson prism, and a photo-detector is a Si photo-diode. The optical source is coupled with the optical guide by using a micron-lens. The recording medium has the polyimide base film of 30 microns thickness and the permalloy intermediate film and the Co-Cr film on said base film. The thickness of the permalloy film is 0.3 micron, and the thickness of the Co-Cr film is 0.3 micron.

Figure 16:
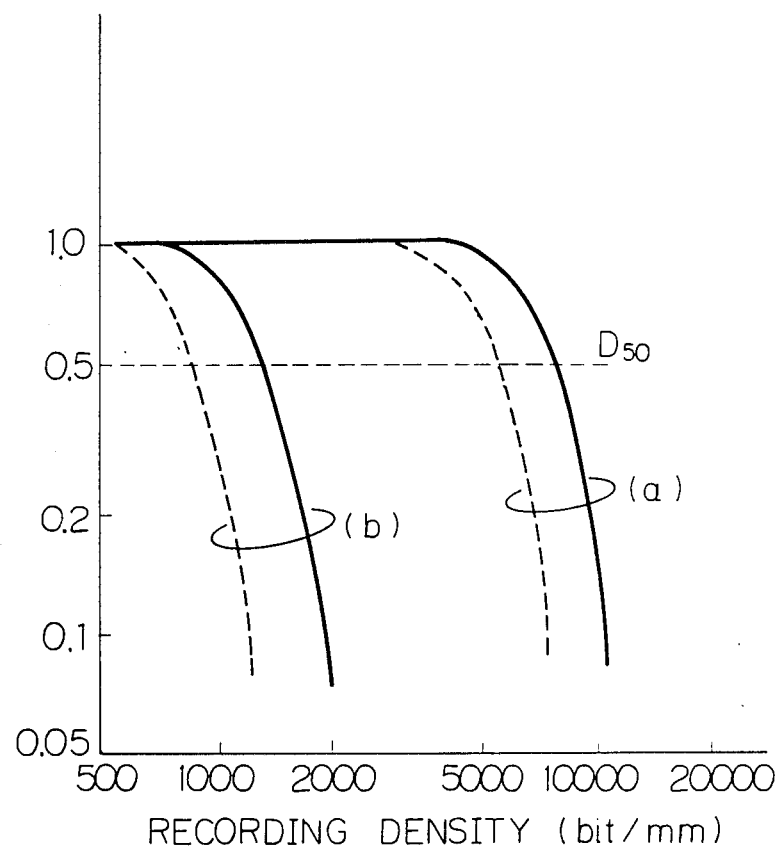
FIG. 16 shows experimental curves of the characteristics of the magnetic head in FIG. 11, FIG. 17, FIG. 18, FIG. 19 and FIG. 20 are modifications of the magnetic head in FIG. 11.

FIG. 16 shows the measured result (the curve (a)) of the above mentioned head, in which the horizontal axis shows the recording density (bits/mm), and the vertical axis shows the normalized output level. The solid line of the curve (a) shows that $D_{50}$ (the recording density when the output level is 0.5 as compared with that of the smaller recording density) is $D_{50}=8000$ bits/mm. In the curve (a), the bias flux is 10 Oe. The curve (b) shows the characteristics of the same head when no bias flux is applied. The dotted lines in the curves (a) and (b) show the characteristics when $SiO_2$ film of 0.1 micron thickness is attached on the recording medium, and those dotted lines show the characteristics of the head when the length between the head and the recording medium is 0.1 micron. The solid lines show the characteristics when the head touches directly with the recording medium.

The SNR (Signal to Noise Ratio) of the experimented head is 35 dB when the normalized output level is 1, and the dynamic range is about 20 dB, which is rather narrow, and the Kerr rotation angle of the permalloy film is 0.2°. If the magnetic material with the larger Kerr rotation angle is used, the dynamic range would be improved.

Figure 17:
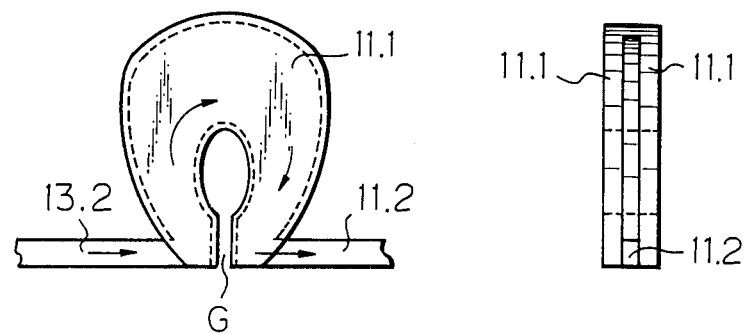

FIG. 17 is the modification of the present head, in which the conductor 11.2 for the bias current is in C-ring shaped sandwiched between the core walls. The operation of the core of FIG. 17 is the same as that of FIG. 13.

Figure 18:
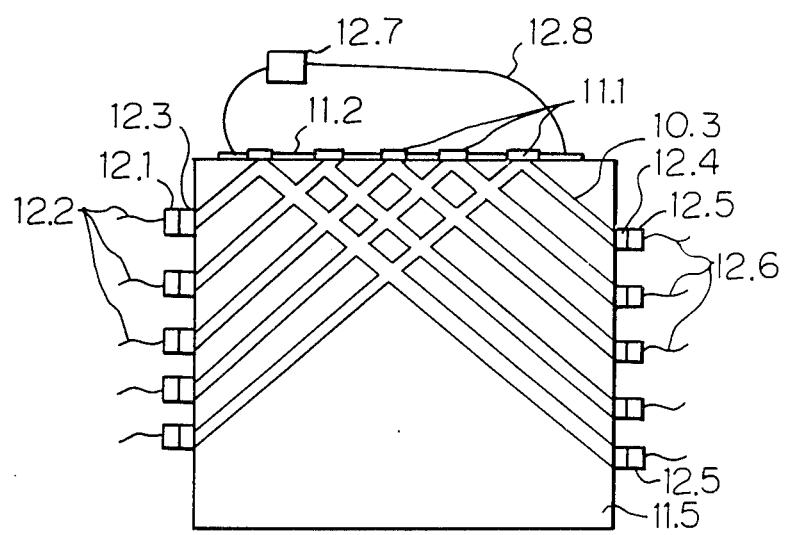

FIG. 18 is another modification, in which a plurality of heads 11.1 are arranged to provide the multi-tracks head. The parallel process of the multi-tracks head is possible since the transmission speed of an optical signal is sufficiently high.

Figure 19:
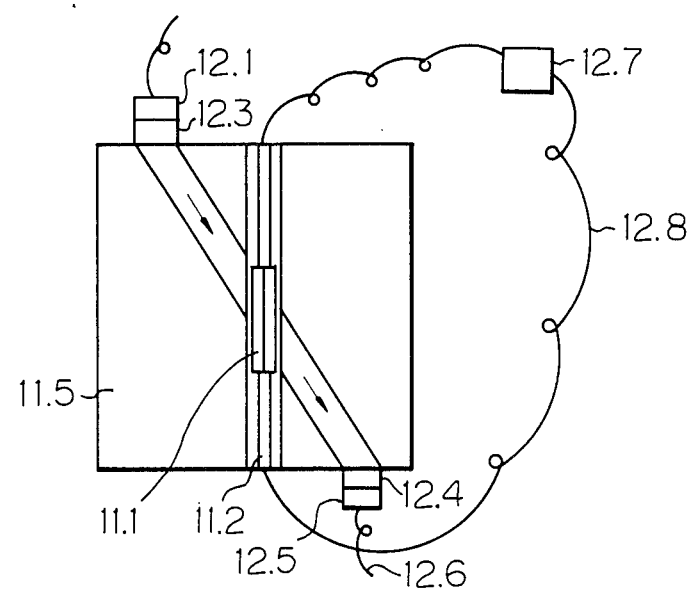

FIG. 19 is still another modification, in which an optical beam transmits through the core 11.1, while an optical beam in FIG. 13 is reflected. The Faraday effect is used in the modification of FIG. 19, while Kerr effect is used in FIG. 13. The conductor 11.2 for the bias current in FIG. 19 must be transparent like tin oxide.

Figure 20:
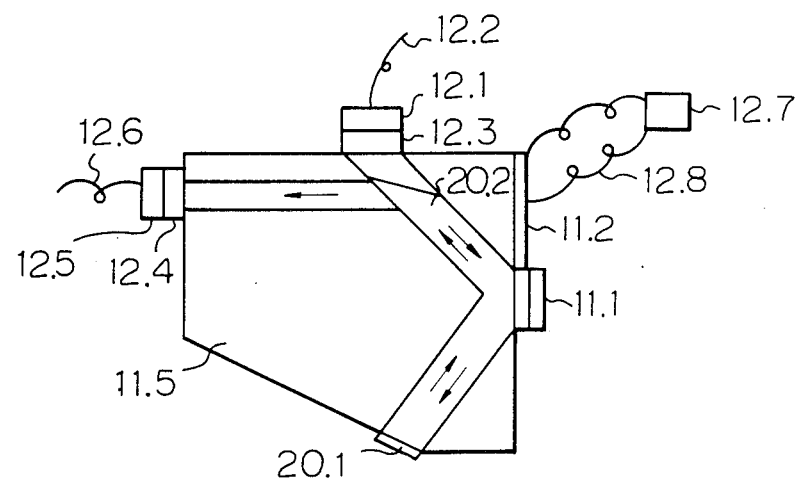

FIG. 20 is still another modification of the present magnetic head, in which 20.1 is a mirror made of silver or aluminium, 20.2 is a slit. The optical beam generated in the optical source 12.1 in FIG. 20 illuminates the core 11.1, then, the reflected beam at the core 11.1 is reflected by the mirror 20.1, then, the beam reflected by the mirror 20.1 illuminates again the core 11.1. The return beam reflected by the core 11.1 is then reflected by the slit 20.2, and then, is applied to the photo-detector 12.5 through the optical analyzer 12.4. The advantage of the modification of FIG. 20 is that both the optical source 12.1 and the optical detector 12.5 are positioned in the common side of the head system, while those members in the embodiment of FIG. 13 are positioned in the opposite sides with each other. The modification of FIG. 20 has further advantage that the Kerr rotation angle is twice as large as that of FIG. 13.

It should be appreciated that the present head system including an optical source, a polarizer, a core, an analyzer, and a photo-detector may be integrated on a small substrate either by a hybrid technique or a monolithic technique. In that case, the head system which may be in a housing less than several mm squares, may replace a conventional flying head.

Although the above embodiments disclose the optical detection of the flux using a polarizer and an analyzer, another optical detection may be possible. For instance, the optical detection with the steps of dividing an optical beam to two paths, transmitting one of the beams to the core, then, combining the first beam which transmits the core and the second beam which does not transmit the core to provide the interference between the two beams. Although the phase change of the beam by the transmission of the core is small and is less than 1°, that phase change is detectable.

Further, it should be appreciated that the present head is used not only for the reproduction but also for the recording. In case of recording, the recording current flows through the arms U, and X (see FIG. 13, for instance) so that the recording flux across the gap G is generated.

As described above in detail, the present head system has at least the following features.
(a) The size of a head system is as small as a spot size of an optical beam, and a core is small enough to have a single magnetic domain.
(b) An magnetization easy axis is in the perpendicular direction of the longitudinal direction of a gap G.
(c) A bias flux is applied in the magnetization hard axis direction.
(d) The core is substantially closed in the magnetization hard axis direction.
(e) The magnetic status in a core is detected by using an optical technique.

Because of the flux amplification effect by the bias flux in the core, the present head has high sensitivity, and can reproduce the magnetic signal less than 0.1 Oe. Thus, the high density reproduction higher than 8000 bits/mm is possible.

The present magnetic head is used for magnetic recording/reproducing for a magnetic tape, a magnetic floppy disc, and/or a magnetic hard disc. Further, the present head can improve the recording density in a digital video tape recorder, broadcasting magnetic tape, and/or audio magnetic tape, and also provides the reduction of the size and the cost of a magnetic recording apparatus.

From the foregoing, it will now be apparent that a new and improved magnetic head has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A magnetic head for recording/reproducing magnetic information on a magnetic medium comprising:
   (a) a thin substantially C-ring shaped magnetic core with a longitudinal gap extending generally perpendicular to the direction of travel of a recording medium which accepts leakage flux from said recording medium;

(b) detection means for detecting magnetic status in said core to provide electrical output signal; wherein said core is small enough to have a single magnetic domain in 3 dimensions, and has a magnetization easy axis along the C-shaped magnetic core axis perpendicular to the longitudinal direction of said gap, said detection means is an optical detection means which projects an optical beam on said core to detect magnetic status of said core, and means for providing magnetic bias flux in a hard magnetization axis which is perpendicular to said magnetization easy axis.

2. A magnetic head according to claim 1, wherein said detection means comprises an optical source for providing an optical beam, a polarizer (12.3) for polarizing said optical beam, polarization maintaining single mode optical guide for illuminating said core with polarized optical beam, another polarization maintaining single mode optical guide for accepting optical beam reflected by the core, an optical analyzer for processing reflected optical beam, and photo-detector for providing electrical signal relating to strength of output beam of said analyzer.

3. A magnetic head according to claim 1, wherein said bias means has a conductor with at least an arm (Y) parallel to easy magnetization axis of the core.

4. A magnetic head according to claim 3, wherein said bias means has another arm (U) for recording flux across said gap for recording.

5. A magnetic head according to claim 1, wherein the length of each side of said core is less than 10 microns.

6. A magnetic head according to claim 1, wherein said core has a pair of closely confronting parallel walls the duration of which is less than 10 microns.

* * * * *